United States Patent Office 2,774,876
Patented Dec. 18, 1956

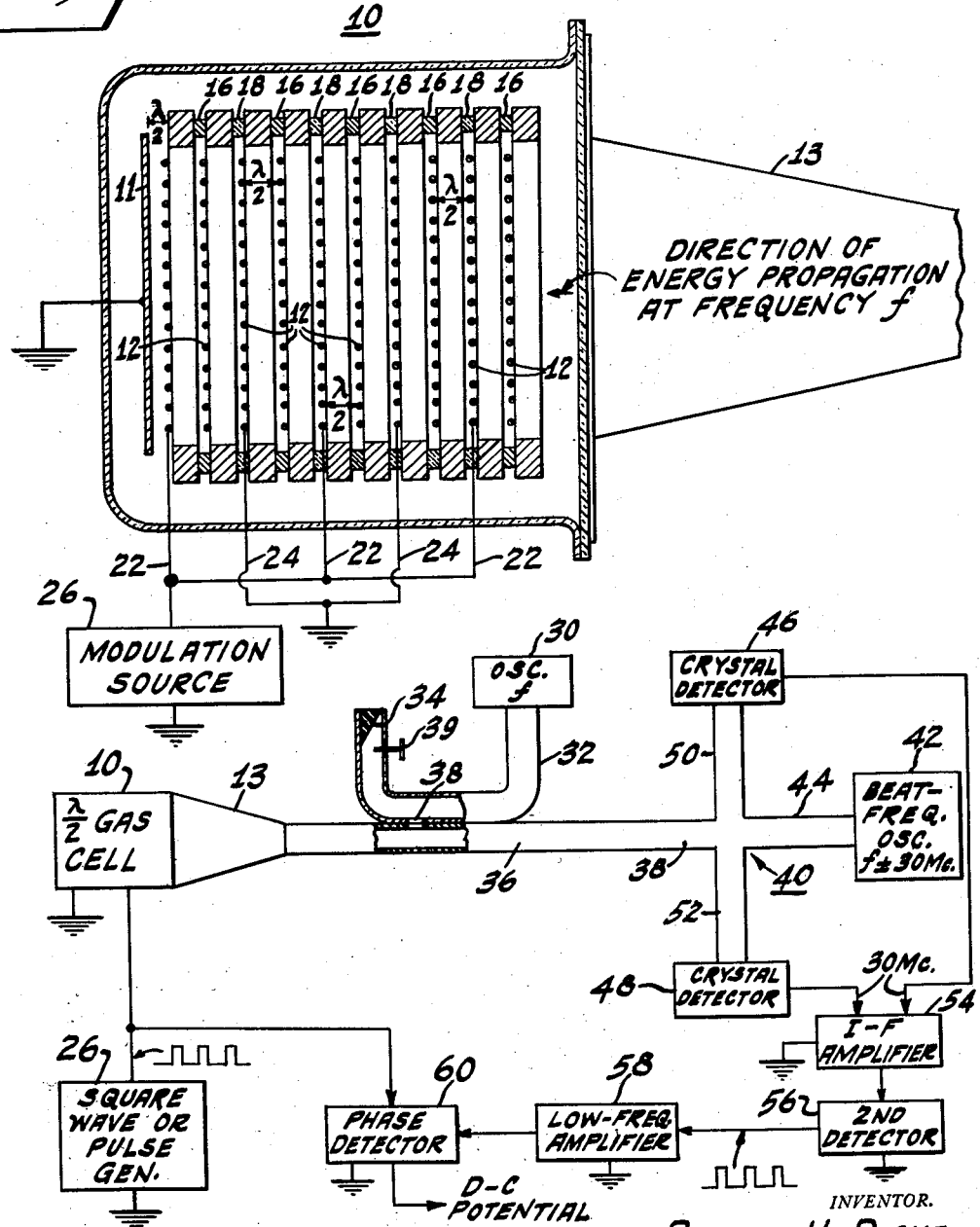

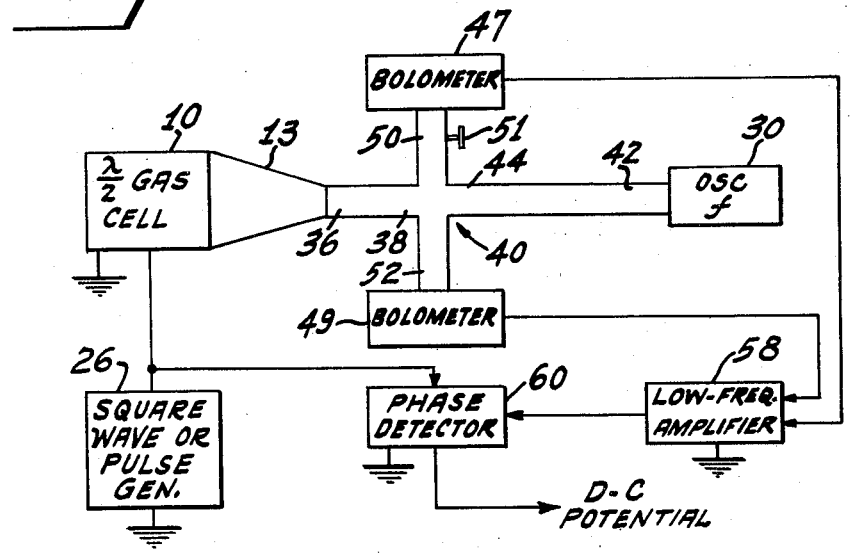
*Fig_3_*
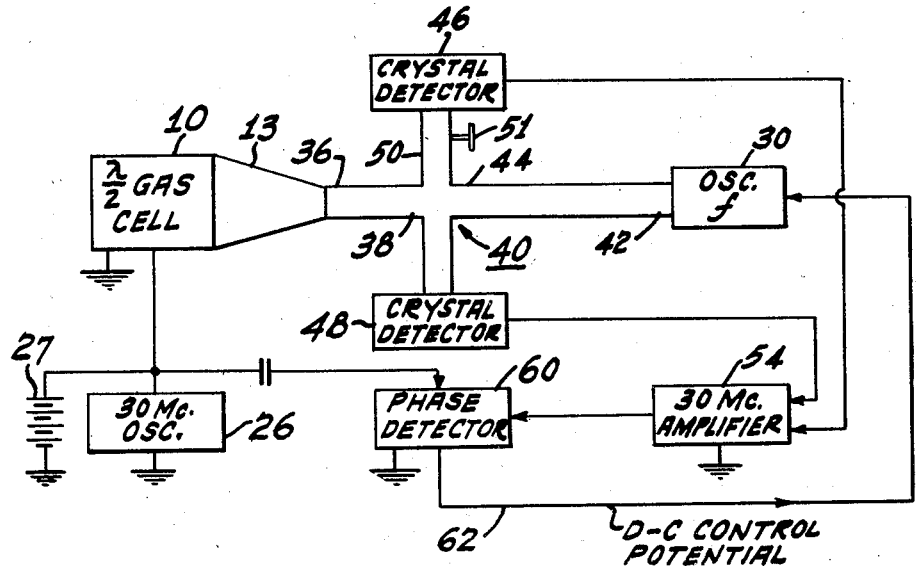
*Fig_4_*
INVENTOR.
ROBERT H. DICKE
ATTORNEY

2,774,876

MOLECULAR RESONANCE GAS CELL

Robert H. Dicke, Princeton, N. J.

Application May 19, 1954, Serial No. 430,855

19 Claims. (Cl. 250—36)

The present invention relates generally to apparatus and systems in which the resonance properties of gas molecules or other particles are utilized for purposes of microwave spectroscopy or frequency control. More particularly, the invention relates to a molecular resonance system in which the molecules in all velocity groups are effective in absorbing microwave energy.

In accordance with the invention a resonance system is hereinafter disclosed and claimed wherein continuous wave microwave excitation is applied to a novel gas cell having conductive elements spaced a half-wavelength apart at the microwave excitation frequency.

It is known in the microwave spectroscopy art to utilize the molecular resonances of a microwave absorptive resonant gas for providing a frequency standard. Such a standard has high stability and is absolute in nature. In typical systems of the type heretofore known a gas cell is filled with a gas capable of exhibiting molecular resonance and is evacuated to a low pressure. Microwave electromagnetic energy is applied to the cell and the gas absorbs energy at the frequency of a selected one of its resonant absorption lines. These typical systems and methods of stabilizing microwave frequencies are disclosed and claimed in copending applications of William D. Hershberger, Serial No. 786,736, filed November 18, 1947, now Patent No. 2,702,350, issued February 15, 1955, Serial No. 4,497, filed January 27, 1948, now Patent No. 2,702,351, issued February 15, 1955, and of Lowell E. Norton, Serial No. 5,603, filed January 31, 1948, now Patent No. 2,559,730.

The frequency width or frequency spectrum of a molecular resonance absorption line determines the effective Q of the frequency standard and thus determines the accuracy of the system in which the standard is employed. There are four known factors which influence the frequency width or spectrum of a gas spectral line. These factors are (1) the natural width of the line, (2) saturation broadening as a result of high microwave power applied to the gas, (3) collision broadening which results from interruption of the natural oscillations of molecules because of collisions with other gas molecules or with other obstacles, and (4) Doppler broadening which results from random motion of molecules, while in resonant oscillation, toward and away from the microwave excitation source.

At microwave frequencies the natural width of the spectral line in (1) is negligible. At sufficiently low power levels the saturation broadening mentioned in (2) is avoided. Reduction in the gas pressure avoids the effects of collision broadening in (3) by increasing the mean free path for collisions between molecules. However, the problem of Doppler broadening (4) remains.

One method of reducing the Doppler breadth of a gas resonance line is described in application Serial No. 243,082, filed August 22, 1951, by Robert H. Dicke and George S. Newell, Jr., now Patent No. 2,749,443. In said application a gas cell is provided containing a gas capable of exhibiting molecular resonance. A continuous wave microwave excitation field is applied to the gas cell. The cell contains electrodes immersed in the gas and spaced a quarter-wavelength apart at the microwave excitation frequency. Either an alternating electric or magnetic field is applied to certain of the gas cell electrodes setting up waves within the cell which cause a limited class of gas molecules moving at selected velocities to constructively reflect the incident microwave energy. Molecules moving at other than the selected velocities cause destructive reflections. Because the molecules contributing to the constructive reflections are all in a narrow group of velocities, Doppler spread of a selected gas resonance line is reduced and the stability of the system is considerably increased.

An object of the present invention is to provide improved methods and means for utilizing molecular resonances in microwave spectroscopy.

Another object of the invention is to provide improved methods and means for utilizing molecular resonances for frequency control or stabilization.

Another object of the invention is to provide a molecular resonance system in which the gas molecules in all velocity groups rather than those in a selected velocity group contribute to a useful output signal.

A further object of the invention is to provide an improved molecular resonance system having continuous wave microwave excitation in which system Doppler broadening of a selected gas resonance line is reduced.

A further object of the invention is to provide an improved gas cell for use in a molecular resonance system.

A still further object of the invention is to provide an improved molecular resonance system which for a given gas pressure and microwave excitation provides a stronger output signal than previous related systems.

The foregoing objects are achieved in accordance with the invention by provision of a molecular resonance system in which continuous wave microwave excitation is applied to a novel gas cell. The gas cell includes a gas capable of exhibiting molecular resonance and also includes elements immersed in the gas which are spaced one-half wavelength apart at the excitation frequency. An electrostatic field is set up between certain of the cell elements which are spaced as described and the cell operation is such that all the gas molecules contribute to absorption of microwave energy incident on the cell, as distinguished from the cell having quarter-wave element spacing wherein only a selected velocity group of molecules contributes to an output wave. The phase of the energy appearing at the output end of the gas cell is dependent upon the frequency of the microwave excitation and may be compared with a reference phase signal to provide a signal which may be utilized either for microwave spectroscopy or frequency stabilization.

The invention will be described in greater detail with reference to the accompanying drawing in which:

Figure 1 is a schematic diagram of a novel gas cell fabricated in accordance with the invention;

Figures 2 and 3 are schematic circuit diagrams, in block form, of molecular resonance systems embodying the gas cell of Figure 1; and Figure 4 is a frequency stabilization system employing the gas cell of Figure 1.

Similar reference characters are applied to similar elements throughout the drawing.

Gas cell description

Referring to Figure 1, a gas cell 10 contains a gas capable of exhibiting molecular resonance. Typical suitable gases which may be employed in the cell 10 include $NH_4$, $SO_2$, $COS$, $CH_3NH_2$, $CH_3OH$, and numerous others. In the present instance ammonia gas is chosen and the gas cell pressure is adjusted to be not greater than $10^{-1}$ mm. of Hg. Preferably the cell pressure is of the order of $10^{-4}$ mm. of Hg.

The cell 10 also contains a plurality of parallel, equi-spaced grid electrodes 12 and a reflector electrode 11. The reflector electrode 11 is positioned between the end of the cell 10 and the last of the series of electrodes 12. The spacing of the reflector from this last grid electrode is one-half wavelength at the operating frequency. The grids 12 preferably are mounted on rectangular frames 14. The electrodes 12 are located in planes substantially normal to the direction of propagation of energy transmitted by the microwave horn 13. The grid wires are perpendicular to the direction of polarization of the microwave energy in order that the energy may propagate in the cell 10 without interference. The thickness of the frames 14 and the thickness of spacers between adjacent frames is made such that each grid electrode 12 is spaced from an adjacent grid electrode 12 by one-half wavelength at the microwave frequency of energy incident on the cell. In the embodiment illustrated conductive spacers 16 and dielectric spacers 18 are employed alternately to provide electrical connection between adjacent grid electrodes and insulation between adjacent pairs of grid electrodes. It will be appreciated, however, that dielectric spacers may be employed throughout the cell without the use of alternate conductive spacers and the desired paired connections made outside the cell 10.

Alternate pairs of electrodes connected together in the manner described, i. e., utilizing conductive and dielectric spacers alternately, are connected outside the gas cell envelope to a modulation source 26 via leads 22. The modulation source 26 sets the potential of the grids connected thereto to a first value. The remaining electrode pairs are set to a second potential which is different from the first value. In a specialized and preferred case, the second potential is ground potential and connection to ground is made by leads 24.

While the cell described above is a single-ended cell employing a reflector electrode 11, it is pointed out that the reflector 11 in certain instances may be omitted and that end of the cell coupled to a second microwave horn.

Gas cell operation

Consider the operation of the gas cell for a single one of the gas molecules which move through the grid system of the cell 10. From the foregoing description of the cell structure, it may be seen that either a constant field region or a field-free region exists between any two adjacent grid electrodes. This condition results from the fact that a given pair of adjacent grid electrodes are electrically connected together and are maintained at an electric potential which is different from that of the pair of adjacent grid electrodes located on either side of the given pair. The gas molecule then moves through the grid system from a region where an electrostatic field acts on the molecule to a field-free region where no electrostatic field acts. Since the molecule has constant velocity with a component of its velocity either in or opposed to the direction of propagation of microwave energy, the condition of field and no field acting on the molecule occurs repetitively. For ammonia gas, a typical value of field strength is of the order of fifty volts per centimeter.

The effect of applying an electrostatic field to the molecule is to change the tuning of the molecule so that its tuning is different from the value it would have with no field applied. As the molecule moves through the grid system its resonant frequency varies back and forth, between two values $f_1$ and $f_2$, the value $f_1$ being with no electrostatic field applied to the molecule and the value $f_2$ being with an applied electrostatic field. Thus the molecule may be considered to be phase or frequency-modulated. In analyzing this frequency-modulation of the tuning of the molecule, one sees that the molecule resonates and absorbs energy at the average of $f_1$ and $f_2$, or at any frequency which differs from the average by an integral multiple of what may be termed the "modulation frequency." The term "modulation frequency" is defined as the rate at which the molecule moves through the cell from a point in one region of electrostatic field to a corresponding point in an adjacent region of electrostatic field. The modulation frequency depends upon the velocity component of the molecule in or opposed to the direction of microwave propagation and upon the spacing between adjacent grid electrodes.

The foregoing portion of the discussion of the cell operation has been directed to a situation in which a coordinate system moves at the same velocity as the molecule. However, the portion of the microwave energy which is being absorbed is absorbed in a system in which the molecules are moving with respect to the incident energy. If $f$ is the frequency of the incident microwave energy, and $$f = \frac{f_1 + f_2}{2}$$

then $$f - \left(\frac{V_x}{C'}\right)f$$

is the frequency the molecule sees, where $V_x$ is the molecule's velocity component in the direction of microwave energy propagation and $C'$ is the velocity of microwave propagation in the medium within the cell 10. In the present instance $C'$ is very nearly the velocity of light. Because of this Doppler shift those frequencies at which the molecule is capable of absorbing energy are shifted either up or down in the frequency spectrum by $$\left(\frac{V_x}{C'}\right)f$$

the direction of the frequency shift depending on the direction of motion of the molecule. The modulation frequency, determined as mentioned previously (by the velocity of the molecule and the grid electrode spacing) is chosen so that the modulation frequency is equal to the Doppler shift frequency seen by the molecule. For this condition the grid electrode spacing must be one-half wavelength at the incident frequency. This means that an absorption line for a molecule always appears at the incident frequency $$f = \frac{f_1 + f_2}{2}$$

which is independent of the velocity of the molecule. Thus all molecules are capable of absorbing microwave energy and the absorption frequency is a sharp well-defined frequency since these molecules are capable of absorbing energy for a long period of time as they move through the grid electrode system.

The foregoing description has been based on the premise that the microwave energy was present in the form of a travelling wave. This is not a basic assumption, however, since the microwave power could be travelling in both directions or be in the form of a standing wave.

Since half-wave rather than quarter-wave electrode spacing is employed in the gas cell hereinbefore described, it is pointed out that with a gas cell of given dimensions fewer grid electrodes are required. The instant cell thus has greater "molecular transparency" than in the case of quarter-wave electrode spacing which means that a molecule can move a greater distance before it strikes a grid wire. Accordingly, the number of grid wires per grid electrode can be increased to provide a more uniform electrostatic field which results in improved system operation.

System operation

Referring to Figure 2, a molecular resonance system is shown which employs the gas cell 10 described with reference to Figure 1. A microwave oscillator 30, such as a 2K50 klystron, produces continuous wave energy at or near frequency $f$. Frequency $f$ may be, for example, 23,870.1 megacycles which is the resonance frequency for the 3–3 ammonia gas line. Energy from the oscillator 30 is coupled through a waveguide 32 having an absorptive termination 34 at one end thereof. A portion of the oscillator energy is coupled from waveguide 32 into a second waveguide 36 by means of a directional coupler 38. The directional coupler 38 may comprise a structure in which two waveguide sections have a common wall including an elongated slotted portion. As is well known, the amount of energy coupled is determined by the slot dimensions. A turning element 39 is provided in waveguide 32 for adjusting the carrier level of the directionally coupled microwave energy to a low level.

The directionally coupled oscillator energy is propagated along waveguide 36 and is applied to the gas cell 10 through the microwave horn 13. The energy is absorbed by the gas molecules, as heretofore discussed, during its traversal of the cell grid system. The microwave energy reaching the end of the cell is reflected by a reflector electrode 11 (shown in Figure 1) to traverse the cell in the opposite direction. The absorbing properties of the gas thus are utilized a second time. The reflected absorbed energy is then coupled by waveguide 36 to one arm 38 of a magic-T 40. The modulation source 26, in the present embodiment of the invention, comprises a low-frequency source which produces square wave pulses having a repetition rate of the order of 100 pulses per second. The purpose of the pulse or square wave modulation is to impress a modulation on the microwave carrier which subsequently may be amplified (after demodulation) at the low frequency modulation rate.

A beat-frequency oscillator 42 is coupled by another section of waveguide 44 to an arm 46 of the magic-T 40 which is decoupled from arm 38. The frequency of operation of the beat oscillator 40 preferably is thirty megacycles higher or lower than the frequency of oscillator 30. The difference frequency between the frequency of the beat oscillator energy and the frequency of the energy from the gas cell 10 is then detected by means of crystal detectors 46 and 48 positioned in the shunt arms 50 and 52 of the magic-T. The difference frequency energy is amplified in and intermediate-frequency differential amplifier 54 and detected in a second detector 56. The output of the second detector 56 is at the modulation source repetition rate and is amplified in a low-frequency amplifier 58 having a bandpass characteristic of the order of 50 to 300 cycles per second. The output of the amplifier 58 and the output of the modulation source 26 are connected to separate input circuits of a phase detector 60. One type of suitable phase detector is described in a copending application of L. E. Norton, Serial No. 228,921, filed May 29, 1951. Because the gas in the cell 10 exhibits an anomalous dispersion effect, the phase of the energy output from the call depends on how close the frequency of the energy incident on the gas is to the resonance frequency of the selected gas spectral line. The phase detector 60 then produces a direct-current output signal having an amplitude and polarity which is dependent upon the direction and extent of frequency drift of the oscillator 30.

The system described above may be employed either for microwave spectroscopy or frequency stabilization, as desired. In the case of frequency stabilization the phase detector output signal may be applied as a control potential via a feedback loop to a frequency control element of the microwave oscillator 30. On the other hand, for purposes of spectroscopy, the feedback loop is not utilized. An unknown gas may be introduced into the gas cell 10 and the frequencies of oscillators 30 and 42 tuned until absorption line responses are noted on a suitable meter or other indicator.

In Figure 3 a further embodiment of the invention is illustrated. In this instance the continuous wave microwave oscillator 30 produces energy at frequency $f$ which is coupled via waveguide 42 into one arm 44 of the magic-T 40. One arm 50 of the shunt arms 50 and 52 of the magic-T includes a tuning element 51 which is adjusted to permit a portion of the oscillator energy to be transferred to the normally decoupled arm 38. This portion of the microwave energy is then propagated through waveguide 36 and introduced into the gas cell 10 by means of the microwave horn 13. The oscillator energy, not absorbed in the gas cell, is propagated back through the horn 13, the waveguide 36 and into the magic-T 40. A pair of bolometers 47 and 49 are connected to the shunt arms 50 and 52 to provide a low-frequency wave at the frequency of the modulation source 26. The amplitude of the bolometer outputs depends upon the intensity of the carrier energy incident thereon. The low-frequency wave is then amplified in an amplifier 58 and coupled to one of the input circuits of the phase detector 60. The modulation source 26 provides the other phase detector input and a direct-current potential is produced at its output terminals which may be utilized either for frequency control or spectroscopy as mentioned previously.

Referring to Figure 4, an embodiment of the invention is shown in which the conditions of electrostatic field and no electrostatic field are set up within the gas cell at a high rate. In this instance the modulation source 26 produces a sinusoidal output which may be, for example, thirty megacycles per second. The thirty megacycle modulation preferably is superimposed on a direct-current potential, supplied by a source 27, so that the electrostatic field in the cell 10 rises from zero potential to a maximum value. The maximum field value depends, as specified in connection with the description of the cell operation, on a selected most probable molecule velocity.

The output energy from the gas cell 10 is mixed in the magic-T 40 with the energy from the oscillator 30. The thirty megacycle difference frequency is detected in crystal detectors 46 and 48, amplified in an amplifier 54, and applied to the phase detector 60. The other input circuit of the phase detector 60 is connected to the output of the thirty megacycle modulation source 26. The direct-current voltage appearing at the output of the phase detector 60 is coupled via a feedback loop 62 to a frequency control electrode of the oscillator 30. Since the control voltage has a sense and magnitude which depends upon whether the oscillator frequency has increased or decreased and by how much, application of this voltage via the loop 62 brings the oscillator 30 back onto frequency.

What is claimed is:

1. A gas cell comprising, an envelope containing a gas at low pressure capable of exhibiting molecular resonance, means for introducing microwave energy into said envelope at a frequency for which said gas is resonant, and a plurality of conductive elements within said cell spaced one-half wavelength apart at said resonant frequency.

2. A gas cell comprising, an envelope containing a gas at low pressure capable of exhibiting molecular resonance, a plurality of conductive elements within said cell and immersed in said gas, means for introducing microwave energy into said envelope at a frequency for which said gas is resonant, and means for spacing said elements one-half wavelength apart at said resonant frequency.

3. A gas cell comprising, an envelope containing a gas at low pressure capable of exhibiting molecular resonance, means through the well of said cell permeable to microwave energy to be introduced therein at a frequency for which said gas is resonant, and a plurality of conductive elements within said cell spaced one-half wavelength apart at said resonant frequency, said elements being positioned in the path of, but not interfering with, the propagation of said microwave energy.

4. A gas cell comprising, an envelope containing a gas at low pressure capable of exhibiting molecular resonance, at least one end of said cell being permeable to microwave energy introduced therein, means for introducing microwave energy into said envelope through said one end of said cell at a frequency for which said gas is resonant, a plurality of conductive elements successively spaced from the energy permeable end of said cell with each element of said plurality being spaced one-half wavelength at said resonant frequency from an adjacent element, and a reflecting element spaced between the end of said cell opposite said energy permeable end and the nearest of said successively spaced elements.

5. A gas cell comprising, an envelope containing a gas at low pressure capable of exhibiting molecular resonance, means through the wall of said cell permeable to microwave energy to be introduced therein, at a frequency for which said gas is resonant and a plurality of grid electrodes within said cell spaced one-half wavelength apart at said resonant frequency.

6. A gas cell as claimed in claim 5 wherein each of said grid electrodes include a plurality of grid wires perpendicular to the direction of polarization of said microwave energy.

7. Apparatus for use in a molecular resonance system comprising, a gas cell including an envelope containing a gas capable of exhibiting molecular resonance, means for introducing microwave energy into said cell at a frequency for which said gas is resonant, a plurality of conductive elements immersed in said gas and spaced one-half wavelength apart at said resonant frequency, and means for electrically connecting together adjacent elements in pairs.

8. Apparatus as claimed in claim 7 including means for connecting alternate pairs of said connected elements to one potential level and for connecting the remaining alternate pairs of said connected elements to a different potential level.

9. A molecular resonance system comprising, a gas cell including an envelope containing a gas at low pressure capable of exhibiting molecular resonance, a continuous wave microwave oscillator for introducing microwave energy into said cell at a frequency for which said gas is resonant, a plurality of conductive elements immersed in said gas spaced one-half wavelength apart at the frequency of said microwave energy, means for establishing a field between certain of said immersed elements, and means for utilizing the portion of said microwave energy not absorbed by said gas.

10. A molecular resonance system comprising, a gas cell including an envelope containing a gas at low pressure capable of exhibiting molecular resonance, a continuous wave microwave oscillator for introducing microwave energy into said cell at a frequency for which said gas is resonant, a plurality of conductive elements immersed in said gas spaced one-half wavelength apart at the frequency of said microwave energy and positioned in the path of said energy, means for establishing a field between certain of said immersed elements, and means for deriving from said cell microwave energy having a phase which is a function of the instantaneous frequency of said oscillator.

11. A molecular resonance system comprising, a gas cell including an envelope containing a gas at low pressure capable of exhibiting molecular resonance, a continuous wave microwave oscillator for introducing microwave energy into said cell at a freqeuncy for which said gas is resonant, a plurality of conductive elements immersed in said gas spaced one-half wavelength apart along an axis of said cell at the frequency of said microwave energy, means coupled to certain of said elements for establishing along said axis successive field and field-free regions, and means for deriving from said cell microwave energy having a phase which is a function of the instantaneous frequency of said oscillator.

12. A system as claimed in claim 11 including a reference phase energy source, and means for comparing the phase of microwave energy derived from said cell with the phase of energy provided by said source to produce a voltage proportional thereto.

13. A system as claimed in claim 12 including a feedback loop between said phase comparison means and said oscillator for stabilizing the frequency of said oscillator.

14. A molecular resonance system comprising, a gas cell including an envelope containing a gas at low pressure capable of exhibiting molecular resonance, a continuous wave microwave oscillator for introducing microwave energy into said cell at a frequency for which said gas is resonant, a plurality of conductive elements immersed in said gas spaced one-half wave-length apart along an axis of said cell at the frequency of said microwave energy, a pulse generator coupled to certain of said elements for repetitively establishing along said axis successive field and field-free regions, means for deriving from said cell microwave energy having a phase which is a function of the instantaneous frequency of said microwave oscillator, and means for comparing the phase of said derived microwave energy with the phase of energy produced by said pulse generator to produce a voltage proportional thereto.

15. A molecular resonance system comprising, a gas cell including an envelope containing a gas at low pressure capable of exhibiting molecular resonance, a continuous wave microwave oscillator for introducing microwave energy into said cell at a frequency for which said gas is resonant, a plurality of conductive elements immersed in said gas spaced one-half wavelength apart along an axis of said cell at the frequency of said microwave energy, a low-frequency oscillator coupled to certain of said elements for repetitively establishing along said axis successive field and field-free regions, means for deriving from said cell microwave energy having a phase which is a function of the instantaneous frequency of said microwave oscillator, and means for comparing the phase of said derived microwave energy with the phase of energy produced by said low-frequency oscillator to produce a voltage proportional thereto.

16. A system as claimed in claim 15 including means for superimposing oscillator energy produced by said low-frequency oscilaltor on a direct-current energy component.

17. A system as claimed in claim 11 wherein said plurality of conductive elements comprise a series of spaced grids and said field establishing means comprises means for producing an electrostatic field.

18. A molecular resonance system comprising, a gas cell including an envelope containing a gas at low pressure capable of exhibiting molecular resonance, a continuous wave microwave oscillator for introducing microwave energy into said cell at a frequency for which said gas is resonant, a plurality of conductive elements immersed in said gas spaced one-half wavelength apart along an axis of said cell at the frequency of said microwave energy, a pulse generator coupled to certain of said elements for repetitively establishing along said axis successive field and field-free regions, a beat-frequency microwave oscillator, means for mixing energy produced by said beat-frequency oscillator with energy derived at the output of said gas cell, a demodulator coupled to the output of said mixing means, and a phase detector coupled to said pulse generator and to the output of said demodulator for producing an output voltage having a sense and magnitude dependent upon the phase relation of waves input thereto.

19. A molecular resonance system comprising, a gas cell including an envelope containing a gas at low pressure capable of exhibiting molecular resonance, a continuous wave microwave oscillator for introducing microwave energy into said cell at a frequency for which said gas is resonant, a plurality of conductive elements immersed in said gas spaced one-half wavelength apart along an axis of said cell at the frequency of said microwave energy, means including a low-frequency oscillator coupled to certain of said elements for producing a sinusoidal wave superimposed on a direct-current wave component for repetitively establishing along said axis successive field and field-free regions, means for mixing energy from said oscillator with energy derived at the output of said cell, and a phase detector coupled between the outputs of said mixing means and said low-frequency oscillator for producing an output voltage having a sense and magnitude dependent upon the phase relation of waves input thereto.

References Cited in the file of this patent

UNITED STATES PATENTS 2,524,290   Hershberger _____ Oct. 3, 1950

OTHER REFERENCES

"Frequency Stabilization with Microwave Spectral Lines" by Hershberger and Norton, RCA Review for March 1948, vol. 9, No. 1.